No. 810,235. PATENTED JAN. 16, 1906.
T. W. VARLEY.
ELECTRICAL MEASURING INSTRUMENT.
APPLICATION FILED FEB. 6, 1905.
3 SHEETS—SHEET 1.
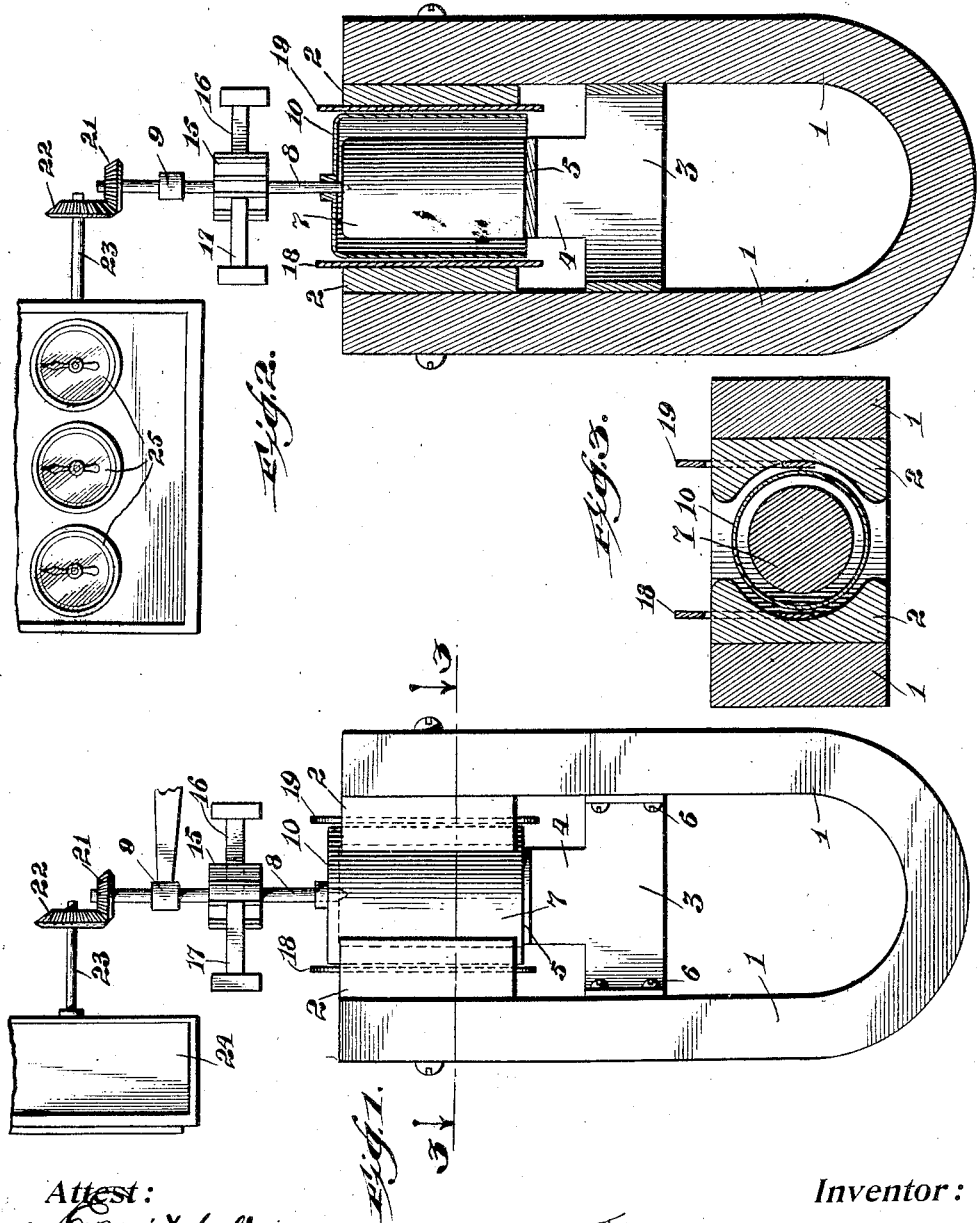
Attest:
Inventor:
Thomas W. Varley
by _____ Atty

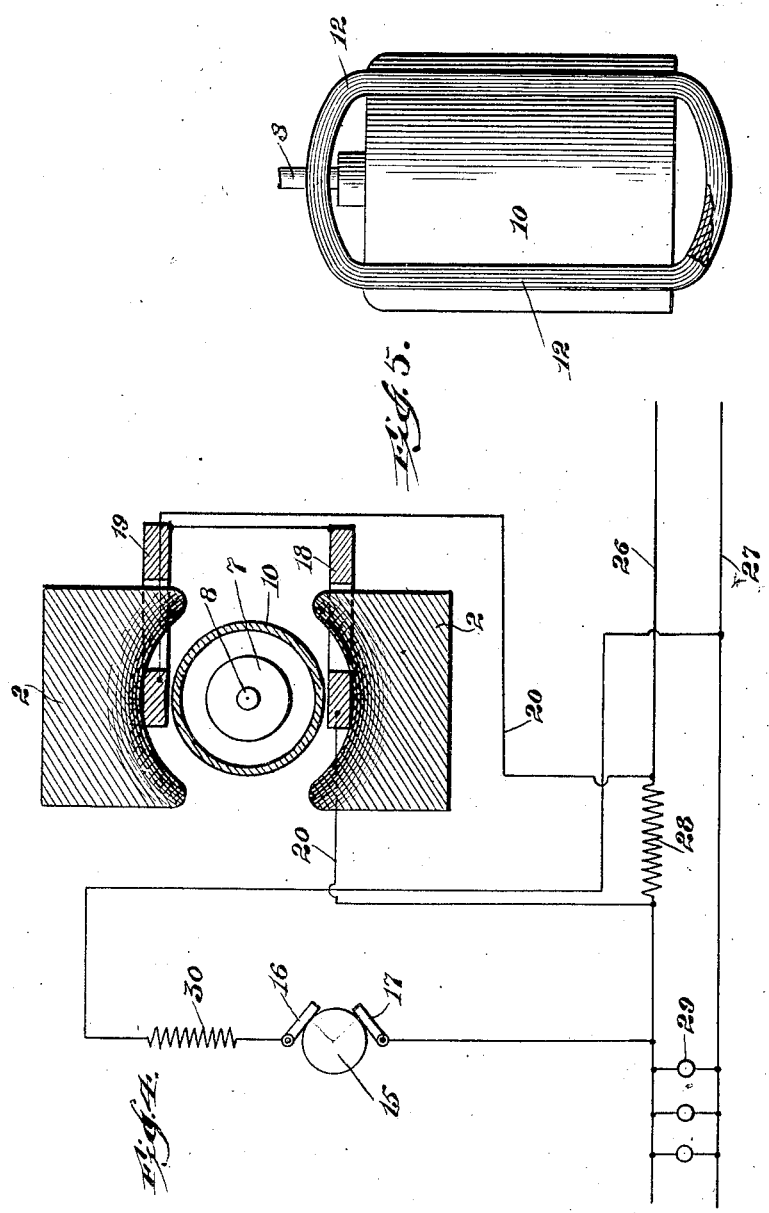

No. 810,235. PATENTED JAN. 16, 1906.
T. W. VARLEY.
ELECTRICAL MEASURING INSTRUMENT.
APPLICATION FILED FEB. 6, 1905.
3 SHEETS—SHEET 3.
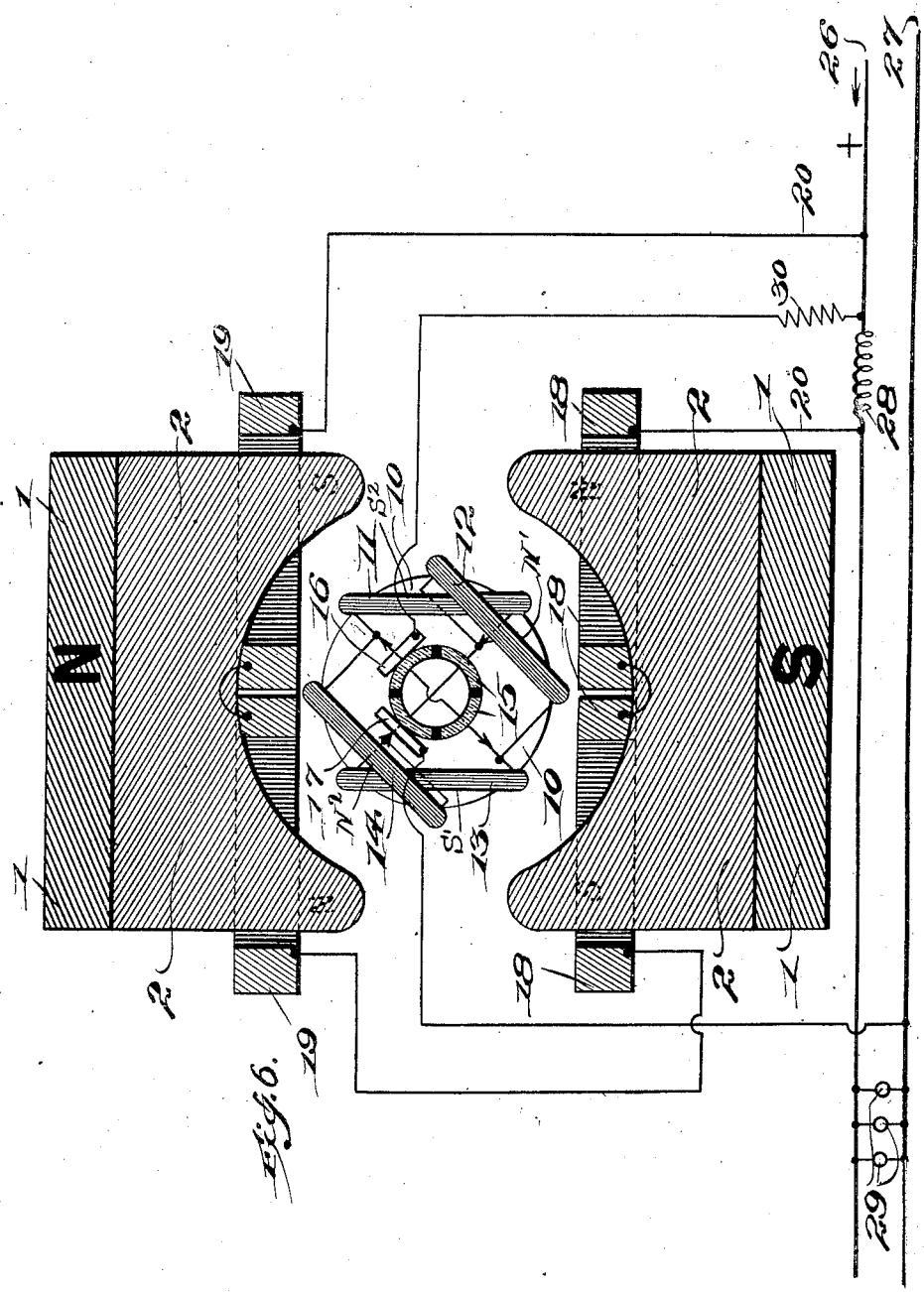
Attest:
Inventor:
Thomas W. Varley
by
Atty

UNITED STATES PATENT OFFICE.

THOMAS W. VARLEY, OF NEW YORK, N. Y., ASSIGNOR OF ONE-HALF TO WALTER S. RUGG, OF NEW YORK, N. Y.

ELECTRICAL MEASURING INSTRUMENT.

No. 810,235.   Specification of Letters Patent.   Patented Jan. 16, 1906.

Application filed February 6, 1905. Serial No. 244,263.

*To all whom it may concern:*

Be it known that I, THOMAS W. VARLEY, a citizen of the United States, residing in the borough of Manhattan, city of New York, State of New York, have invented a new and useful Improvement in Electrical Measuring Instruments, of which the following is a specification.

My invention relates to electrical measuring instruments wherein advantage is taken of a permanent magnetic field in combination with stationary and movable coils so disposed that a current passing through the stationary coil will shift or distort the lines of force of the permanent magnet in such manner that they will cause a torque on the movable coil, the function of the stationary coil being simply to so shift the lines of force in the permanent magnetic field and not necessarily to create the magnetic field itself, as in the ordinary dynamometer.

In the following I have described, with reference to the accompanying drawings, a structure illustrating one embodiment of my invention, the features thereof being more fully pointed out hereinafter in the claims.

In the drawings, Figure 1 is a front elevation of a structure designed to be used as an integrating watt-hour meter, parts being broken away. Fig. 2 is a longitudinal view, partly in section, of the structure shown in Fig. 1, the indicator being turned so as to show the dial-face. Fig. 3 is a cross-sectional view of the structure shown in Fig. 1 along the line 3 3 thereof. Fig. 4 is a view, partly diagrammatic, showing also a bottom view of the structure shown in Fig. 1 partly in section. Fig. 5 is a detail view to more clearly illustrate the windings of the movable coil. Fig. 6 is a view, partly diagrammatic, showing the connections of the moving and stationary parts, having particular application to the illustration of the invention as applied to a watt-hour meter with a closed-circuit armature.

Similar numerals of reference indicate similar parts throughout the several views.

1 represents a permanent horseshoe-magnet provided with pole-pieces 2 2, of soft iron. A brace 3, preferably of brass, having an upwardly-projecting rib 4 and a shelf 5 at right angles to the rib is fastened to the magnet in any suitable manner, as by screws 6 6. A soft-iron core 7 of any suitable construction is suitably fixed upon shelf 5 between pole-pieces 2 2, a suitable air-gap being left between the core and the pole-pieces. The core 7 forms a bearing for one end of a shaft 8, the other end of the shaft being journaled in a fixed bearing 9, suitably supported. This shaft carries at its lower end a cup 10, preferably of aluminium and placed in the air-gap between the pole-pieces 2 2 and the core 7. The cup 10 supports windings 11, 12, 13, and 14, constituting the movable coil, the windings, as illustrated, representing a four-pole armature, the terminals of the windings being connected to the commutator-segments, as shown. These windings are preferably disposed as shown in Figs. 5 and 6, Fig. 5 showing one winding only and Fig. 6 showing the four windings and connection of said windings to the commutator by a closed-circuit method of connection, the windings forming on their outside faces magnetic polarities $N'$ $S'$ $N^2$ $S^2$, as shown. Intermediate the core 7 and the bearing 9 shaft 8 carries a commutator 15, provided with brushes 16 and 17, disposed in this case, as shown in Fig. 6, at an angle of ninety degrees to each other, the opposite segments of the commutator being connected together when it is desired to use but two brushes. The windings 18 and 19 of the stationary coil, whose terminals are connected to a shunt 20 20 in one leg of the main circuit, are supported in any suitable manner between the pole-pieces 2 2 and the cup 10, the windings being disposed respectively around a portion of each pole, as shown in Fig. 6, or around two of the poles, as shown in Fig. 4. At the upper end of shaft 8 is a gear-wheel 21, meshing with gear 22 on shaft 23, acting to operate suitable means for indicating the revolutions of the cup 10. 24 represents the registering mechanism, and 25 the dials.

The operation of the apparatus is as follows: Wires 26 and 27 lead from the generator (not shown) through resistance 28 to the load 29. The commutator-brushes 16 and 17 are in series with an adjustable resistance 30 across the mains 26 27, as shown. The stationary coil is in shunt with one leg of the main circuit around the resistance 28. The movable coil is normally in a balanced condition with relation to the magnetic field because of the balanced torque exerted on such coils when carrying current. A current from the mains through the stationary coil shifts or distorts the lines of force by strengthening one side and weakening the opposite side, as shown in Fig. 6 in dotted lines on the pole-pieces, causing a torque on the movable coil on cup 10, resulting in the rotation of the cup—that is to say, when current passes through the stationary coil the main magnetic field is shifted laterally parallel to itself, so as to cause a torque proportional to the lateral shifting. Cup 10 being fastened to shaft 8 causes the latter to rotate and through the means set forth actuates the registering apparatus. The cup is preferably of aluminium, because of its lightness and also to act as a drag to the moving coil, because of the induced currents being set up in it by virtue of its moving through a varying magnetic field, resulting in the speed of rotation of the cup being proportional to the product of the current in the fixed coil and the moving coil or the watts of energy delivered to the load. As illustrated, the apparatus is adapted to be used as a watt-hour meter, as the total magnetism across the air-gap is constant.

The principle of the invention as shown and described is applicable to either alternating or direct currents and may be utilized in the construction of voltmeters and ammeters, as well as in either integrating or indicating wattmeters, as is clear to any one skilled in the art.

It is obvious that the details illustrated may be considerably varied and parts and functions transposed without departing from the spirit of my invention—as, for instance, using a greater or less number of windings in the stationary or movable coils than illustrated or transposing the functions of the stationary and movable coils, so that the stationary coil can be in connection with the adjustable resistance 30 across the mains and the movable coil across the shunt 20 20.

I do not restrict myself to any of the details as shown and described.

Having described my invention, what I claim, and desire to secure by Letters Patent, is—

1. An electrical measuring instrument comprising a permanent magnetic field, a stationary coil adapted to shift the lines of force of the magnetic field, and a movable coil in the magnetic field normally in a balanced condition relative thereto but becoming unbalanced when the magnetic field is shifted.

2. An electrical measuring instrument comprising a permanent magnetic field, a stationary coil adapted to shift the lines of force of the magnetic field, a movable coil in the magnetic field normally in a balanced condition relative thereto but becoming unbalanced when the magnetic field is shifted and means for measuring the extent of movement of the movable coil.

3. An electrical measuring instrument comprising a permanent magnetic field, a stationary coil adapted to shift the lines of force of the magnetic field, a movable coil in the magnetic field normally in a balanced condition relative thereto but becoming unbalanced when the magnetic field is shifted, means for controlling the movement of the movable coil whereby said movement is caused to be proportional to the torque of the movable coil and means for measuring the extent of said movement.

4. In an electrical measuring instrument a permanent magnet for creating a field, a stationary coil and a movable coil, said stationary coil being so located as to shift the permanent magnetic field in proportion to the current which it carries, the torque of movement of the movable coil being proportional to the product of the current in the movable and the fixed coils.

5. In an electrical measuring instrument a permanent magnet for creating a field, a stationary coil thereon and a movable coil, one of said coils being adapted to carry current proportional to the load and the other to carry current proportional to the pressure, said stationary coil being so located as to shift the permanent magnetic field in proportion to the current which it carries.

6. In an electrical measuring instrument a permanent magnet for creating a field, a stationary coil or coils for creating a field to distort or displace said permanent field, a movable-coil armature in a balanced condition with relation to said permanent field when no current is traversing the stationary coil, the armature-coil and the stationary coil carrying current proportional to the current and the voltage so as to produce a torque proportional to the energy consumed.

In witness whereof I have hereunto signed my name in the presence of two subscribing witnesses.

THOMAS W. VARLEY.

Witnesses:
 E. F. PORTER,
 SEABURY C. MASTICK.